(12) United States Patent
Lowe

(10) Patent No.: US 7,530,694 B2
(45) Date of Patent: May 12, 2009

(54) FLAT PROJECTION TELEVISION

(75) Inventor: Jerry B. Lowe, San Clemente, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 514 days.

(21) Appl. No.: 11/346,074

(22) Filed: Feb. 1, 2006

(65) Prior Publication Data

US 2007/0177110 A1  Aug. 2, 2007

(51) Int. Cl.
*G03B 21/22* (2006.01)
*G03B 21/28* (2006.01)

(52) U.S. Cl. .......................................... 353/78; 353/99

(58) Field of Classification Search .................. 353/77, 353/78, 74, 73, 69, 99; 348/789; 359/453, 359/457, 460, 546, 641, 838, 850–864
See application file for complete search history.

(56) References Cited

U.S. PATENT DOCUMENTS

| | | | |
|---|---|---|---|
| 5,499,067 A * | 3/1996 | Shibazaki | 353/99 |
| 6,002,826 A * | 12/1999 | Veligdan | 385/120 |
| 6,074,196 A * | 6/2000 | Shimizu et al. | 425/556 |
| 6,328,448 B1 | 12/2001 | Beiser | |
| 6,406,150 B1 * | 6/2002 | Burstyn | 353/69 |
| 6,457,834 B1 | 10/2002 | Cotton et al. | |
| 6,704,484 B1 | 3/2004 | Cotton | |
| 6,895,151 B2 * | 5/2005 | Biscardi et al. | 365/120 |
| 2004/0156117 A1 * | 8/2004 | Takaura et al. | 359/651 |

OTHER PUBLICATIONS

Shikama, S., et al., Refractive-reflective optical system for realizing an ultra-thin rear projector, Journal of the SID Nov. 4, 2003, pp. 677-683.

* cited by examiner

*Primary Examiner*—William C Dowling
*Assistant Examiner*—Ryan Howard
(74) *Attorney, Agent, or Firm*—Orrick, Herrington & Sutcliffe LLP

(57) ABSTRACT

A flat projection television comprising an imagine engine mounted adjacent a top of an enclosure and optically coupled to a collimator mirror, a flat mirror, a mirror assembly comprising a plurality of cylindrical mirrors, and a diffuser screen. The image engine includes a cylindrical lens which expands an outgoing image horizontally. The image engine projects the image downward from the top of the enclosure toward the bottom of the enclosure where the horizontally expanding image encounters the collimator mirror which collimates the expanding beam bringing the horizontal lines back into parallel with one another. The collimator mirror also reflects the collimated image towards the front of the enclosure where it encounters the flat mirror oriented to deflect the image upward into the mirror box location of the enclosure at an appropriate angle. As the image is projected from the flat mirror, it encounters the cylindrical mirrors of the mirror assembly which expand each horizontal line of the image to present a fully expanded and complete image on the diffuser screen.

13 Claims, 3 Drawing Sheets

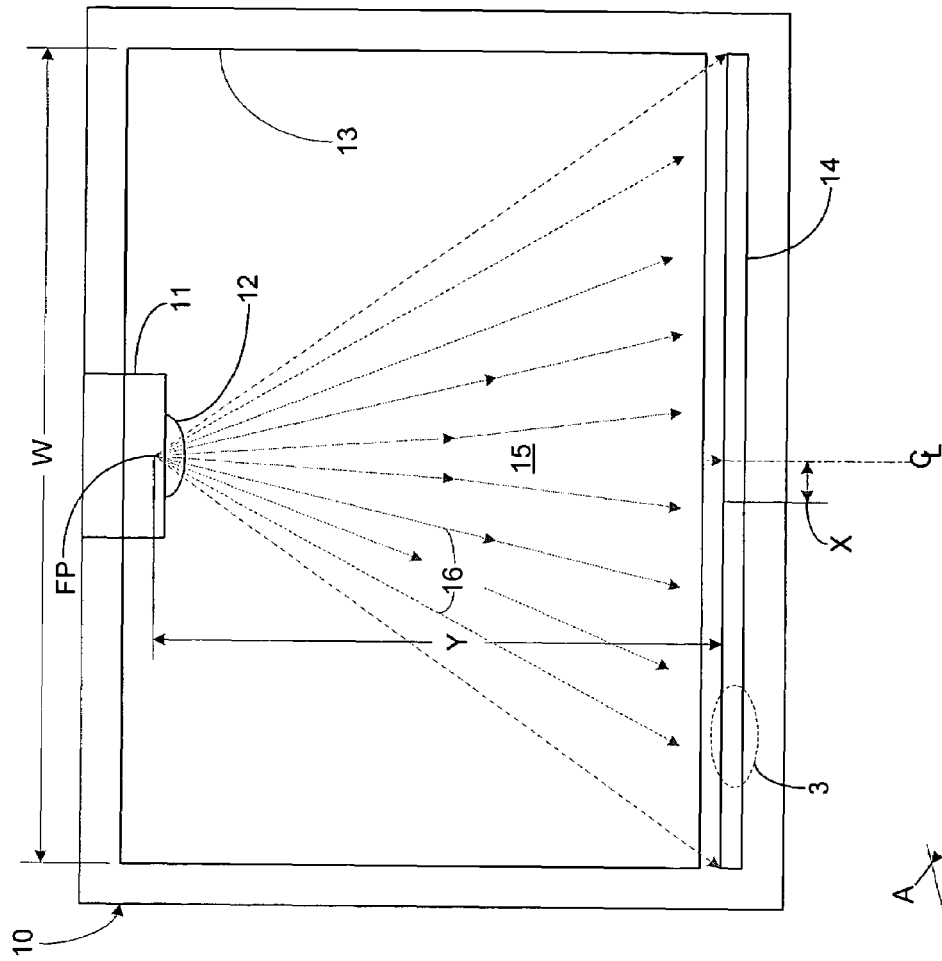
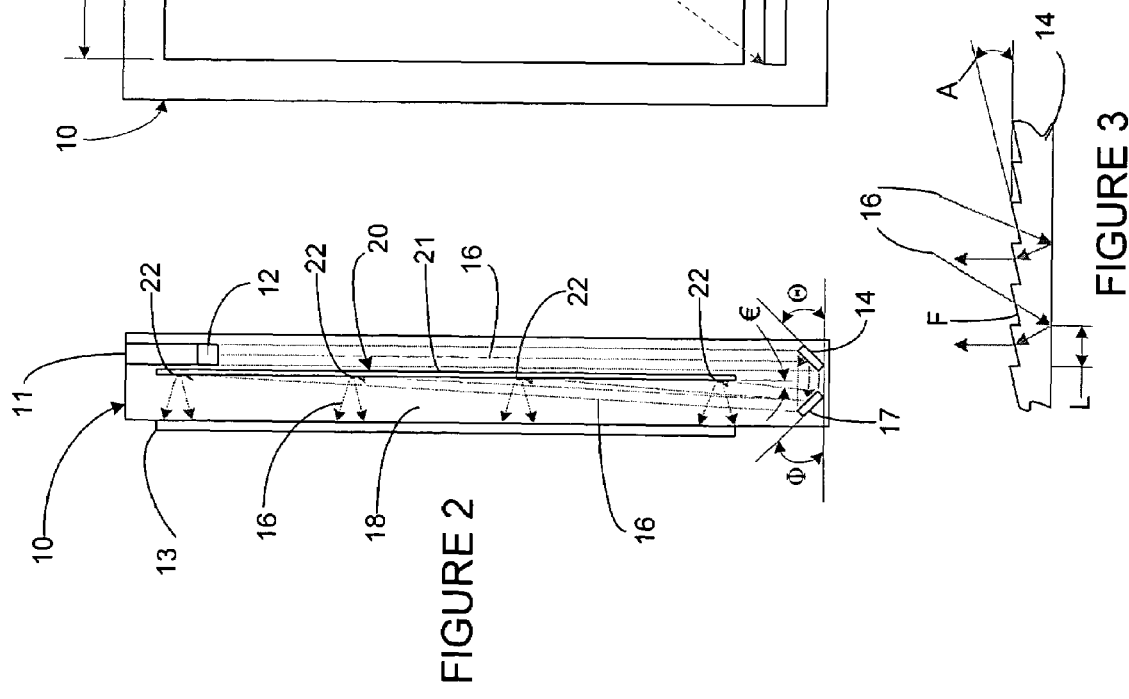

FLAT PROJECTION TELEVISION

FIELD

The present invention relates generally to projection television sets, and more particularly to a flat or thin projection television configuration.

BACKGROUND

Projection television sets were a popular alternative to picture tube television sets, as they provided relatively large viewable screens that could not be efficiently produced using conventional picture tubes. Projection television sets typically include an enclosure with an optical unit, a mirror, and electronic components for receiving and projecting an image onto a screen assembly mounted on the front of the enclosure, and tend to have a relatively deep or thick enclosure. For consumers desirous of thin or relatively flat television sets with large viewable screens, plasma and LCD televisions have become a popular alternative to projection television sets.

In order to make a thin or relatively flat projection television set, the image must be properly folded and projected onto the screen in a relatively shallow box. The proper folding of the optics in a box or enclosure having a thickness or depth on the order of conventional plasma television sets has proven to be difficult.

Therefore, it would be desirable to provide a projection configuration that can be employed in a relatively thin or shallow enclosure of a projection television set.

SUMMARY

The present disclosure is directed to an improved image projection configuration for a projection television set that facilitates the proper folding of optics within a shallow enclosure. In a preferred embodiment, a flat projection television set comprises a relatively shallow enclosure enclosing an imagine engine optically coupled to first and second mirrors, a mirror assembly comprising a plurality of mirrors, and a screen. The image engine is preferably mounted toward the center rear of the top of the enclosure and is situated so as to project its image downward from the top of the enclosure toward the bottom of the enclosure. The image engine preferably includes a cylindrical (anamorphic) lens which horizontally expands the outgoing image across the width of the screen. At the bottom of the enclosure the horizontally expanding image encounters the first mirror, which is preferably a collector/collimator mirror having a Fresnel lens adapted to collimate the horizontally expanding image and return the expanding image to coherency by bringing the horizontal lines back into parallel with one another. The first mirror or collimator mirror also reflects the image towards the front of the enclosure. Near the front of the enclosure, the collimated image or beam encounters the second mirror, which is preferably flat and situated to deflect the image upward into the mirror box location of the enclosure. The collimated image leaving the flat mirror has a line width sufficient for a full screen image but not the height. However, as the collimated image is deflected from the flat mirror it encounters the mirror assembly which expands each horizontal line of the collimated image vertically relative to the screen to present a fully expanded and complete image on the diffuser screen. The plurality of mirrors of the mirror assembly are preferably cylindrical.

Other objects and features of the present invention will become apparent from consideration of the following description taken in conjunction with the accompanying drawings.

DESCRIPTION OF THE DRAWINGS

FIG. 1 is a front view of a projection television set showing an image projection assembly within an enclosure.

FIG. 2 is a side view of the projection television set showing the components of an projection assembly.

FIG. 3 is a detail view of a collimated mirror taken along line 3 in FIG. 1.

DETAILED DESCRIPTION

Figure 4:
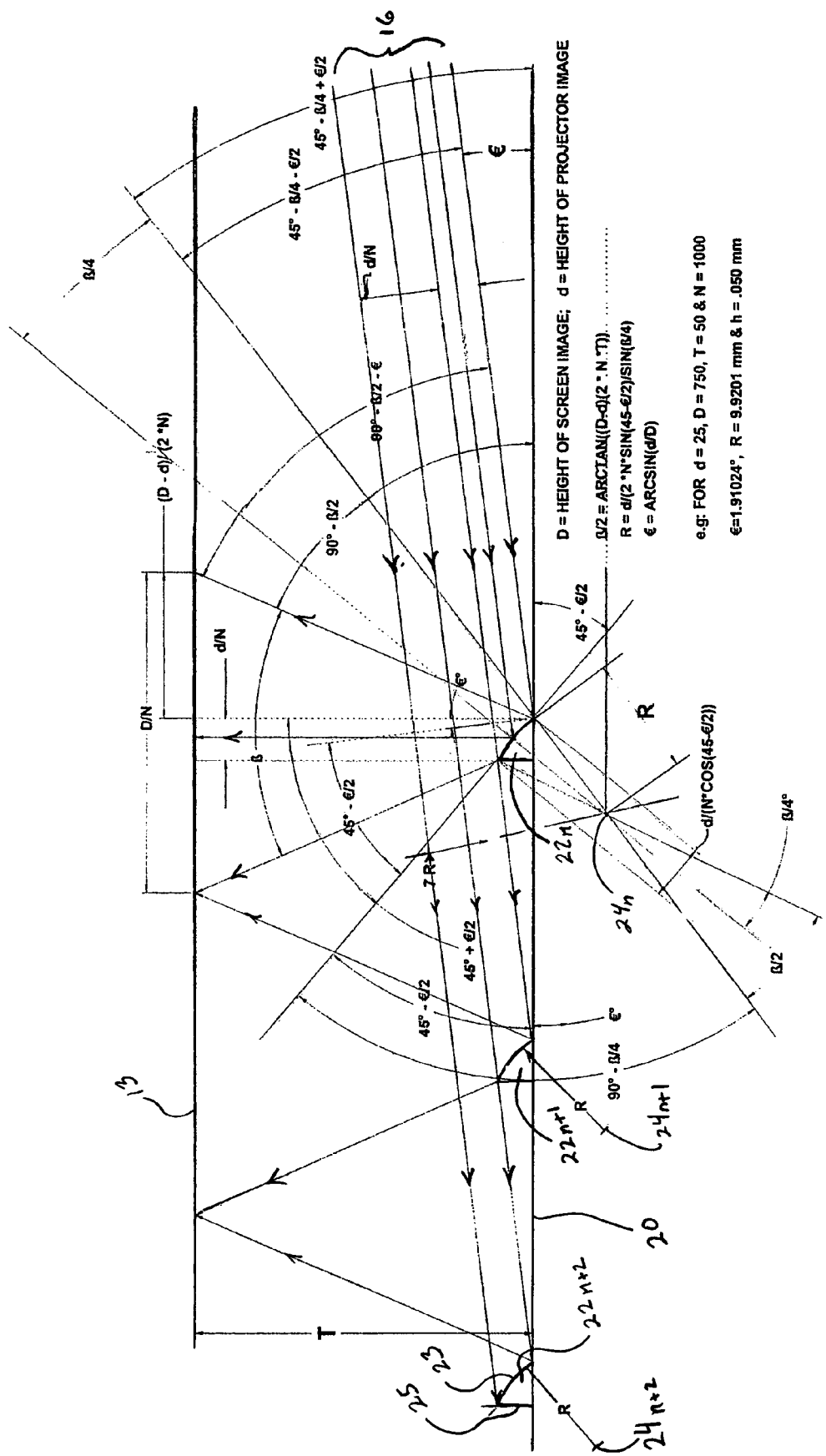
FIG. 4 is a side view of a cylindrical mirror assembly.

Each of the additional features and teachings disclosed below can be utilized separately or in conjunction with other features and teachings to provide an improved image projection configuration for a flat projection television set that facilitates the proper folding of optics within a shallow enclosure. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Turning to FIGS. 1 and 2, a preferred embodiment of a projection television set is provided. As depicted, the projection television set includes an enclosure 10 preferably having a relatively shallow depth. Included within the enclosure is an imagine engine 11 optically coupled to first 14, second 17 and third 20 mirrors and a diffuser screen 13. The image engine 11 can be a DMD, DLP or the like and preferably includes a cylindrical (anamorphic) lens 12 coupled thereto. The image engine 11 is preferably mounted toward the center rear of the top of the enclosure 10 and is situated so as to project its image 16 downward from the top of the enclosure toward the bottom of the enclosure 10. As the outgoing image 16 passes through the cylindrical lens 12, it expands through the horizontal expansion zone 15 across the width W of the screen 13 and enclosure 10.

The first 14 and second 17 mirrors a preferably situated at the bottom of the enclosure 10. The first mirror 14 is preferably a collector/collimator mirror having a Fresnel lens adapted to collimate the horizontally expanding image 16 and return the expanding image 16 to coherency by bringing the horizontal lines back into parallel with one another (as depicted in FIG. 3). The collimator mirror 14, which is preferably constructed using conventional Fresnel lens technology, is preferably situated symmetrically about the horizontal centerline of the screen 13, as shown in FIG. 1. As depicted in detail in FIG. 3, the collimator faces F of the collimator mirror 14 are preferably set at an angle A preferably defined as $$A = (ARCTAN(X/Y))/2 \qquad (1.0)$$

where Y is the distance from the focal point FP of the image engine 11 to the collimator mirror 14 and X is the distance from the horizontal center line of the screen 13 to detail or collimator face area of the collimator mirror 14. The length L of each collimator face F along the horizontal axis of the mirror 14 is preferably defined as $$L = W/1000 \qquad (2.0)$$

where W is the width of the screen 13. As one skilled in the art would understand, the denominator affects the horizontal detail clarity. The collimator mirror 14 is also preferably set at an angle $\Theta$ to reflect the image 16 towards the second mirror 17 and the front of the enclosure 10.

The second mirror 17, which is preferably flat, is preferably situated near the bottom and front of the enclosure 10. The flat mirror 17 is also preferably set at an angle $\phi$ to deflect the image 16 upward into the mirror box 18 of the enclosure 10 at an appropriate angle $\epsilon$ to the third mirror 20, as depicted in FIGS. 2 and 4.

Figure 5:
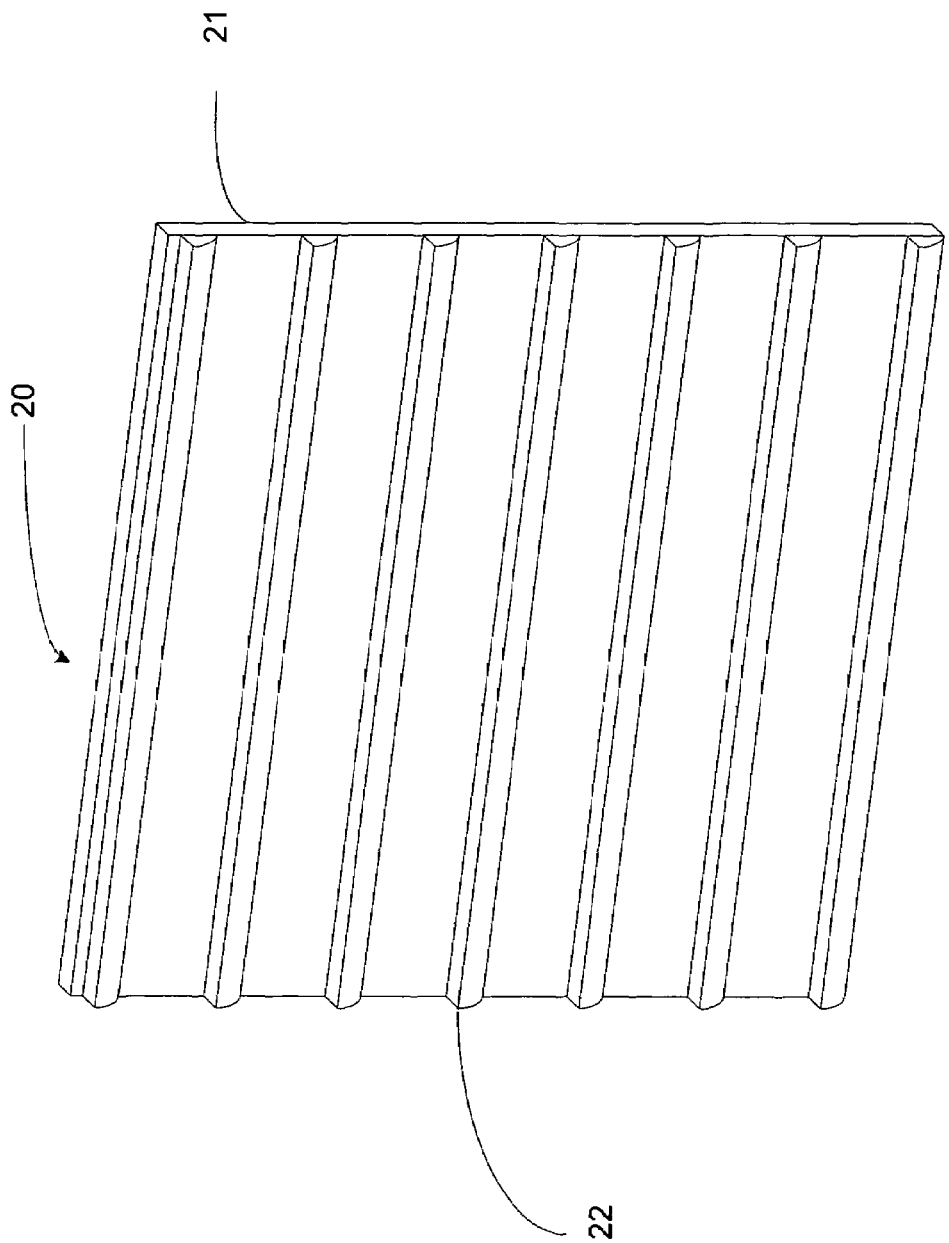
FIG. 5 is an isometric view of the cylindrical mirror assembly.

Referring to FIGS. 4 and 5, the third mirror or mirror assembly 20, as depicted, preferably includes a plurality of cylindrical mirrors 22 extending horizontally across a base 21. Preferably, the mirror assembly 20 is formed as a unitary piece of plastic with a silver aluminum coating. The mirrors 22 preferably have arcuate faces 23 with a radius R. As depicted, the center $24_n$ of the arc of the first mirror $22_n$ is preferably situated 7R from the top of the rear edge 25 of the third mirror $22_{n+2}$. The relationship between an appropriate angel of incidence $\epsilon$ the image 16 is projected along from the flat mirror 17 to the mirrors 22 and the radius R of the arcuate face 23 is preferably defined as follows:

$$\epsilon = ARCSIN(d/D) \qquad (3.0)$$

$$\beta/2 = ARCTAN((D-d)(2*N*T)) \qquad (4.0)$$

$$R = d/(2*N*SIN(45-\epsilon/2)/SIN(\beta/4)) \qquad (5.0)$$

where

D—is the height of the screen image,
d—is the height of the projected image,
T—is the distance between the screen 13 and the mirror assembly 20, and
N—is the number of mirrors.

As an example, where d=25, D=750, T=50 and N=1000, $\epsilon$=1.91024°, R=9.9201 mm and h=0.050 mm.

In operation, the image engine 11 projects its image 16 downward from the top of the enclosure 10 toward the bottom of the enclosure 10. As the outgoing image 16 passes through the cylindrical lens 12, the cylindrical lens 12 preferably expands the outgoing image 16 through the horizontal expansion zone 15 and across the width of the screen 13. At the bottom of the enclosure 10 the horizontally expanding image 16 encounters the collimator mirror 14 which collimates the expanding beam 16 and returns the expanding image 16 to coherency by bringing the horizontal lines back into parallel with one another. The collimator mirror 14 also reflects the image 16 towards the front of the enclosure 10 where the collimated beam 16 encounters the flat mirror 17. The flat mirror 17 deflects the image 16 upward into the mirror box location 18 of the enclosure 10 at an angle $\epsilon$ to the mirror 20. The collimated image 16 leaving the flat mirror 17 has the necessary line width required for a full screen image but not the height. As the image 16 is projected from the flat mirror 17 it encounters the arcuate faces 23 of the cylindrical mirrors 22 which expand each horizontal line of the image 16 to present a fully expanded and complete image on the diffuser screen 13.

The particular examples set forth herein are instructional and should not be interpreted as limitations on the applications to which those of ordinary skill are able to apply this device. Modifications and other uses are available to those skilled in the art which are encompassed within the spirit of the invention as defined by the scope of the following claims.

What is claimed is:

1. A projection television set comprising:
   an enclosure,
   an image engine situated adjacent the top of the enclosure and adapted to project an image downward within the enclosure,
   a first mirror optically coupled to the image engine and adapted to collimate an image projected from the image engine,
   a second mirror coupled to the first mirror and adapted to deflect a projected image upward within the enclosure,
   a mirror assembly comprising a plurality of mirrors adapted to deflect and expand horizontal lines of the projected image toward the front of the enclosure, wherein each of the plurality of mirrors is a cylindrical mirror, and
   a screen coupled to the mirror assembly and located toward the front of the enclosure.

2. The projection television set of claim 1 wherein the image engine is horizontally centered relative to the width of the screen.

3. The projection television set of claim 1 wherein the image engine includes a cylindrical lens that is adapted to horizontally expand relative to the width of the screen an image projected from the image engine.

4. The projection television set of claim 1 wherein the first mirror includes a Fresnel lens.

5. The projection television set of claim 1 wherein the first mirror is adapted to reflect a downwardly directed imagine horizontally toward the front of the enclosure.

6. The projection television set of claim 5 wherein the first mirror is oriented at a first angle relative to a horizontal axis.

7. The projection television set of claim 6 wherein the second mirror is oriented at a second angle to the horizontal axis.

8. The projection television set of claim 1 wherein the second mirror is a flat mirror.

9. The projection television set of claim 1 wherein the screen is a diffuser screen.

10. The projection television set of claim 1 wherein each of the plurality of mirrors has a radius R and is oriented relative to the second mirror such the image deflected by the second mirror is incident on the mirror at an angle $\epsilon$, wherein the mirror radius R and angle of incidence $\epsilon$ relate to one another according to $$R=d/(2*N*\mathrm{SIN}(45-\epsilon/2)/\mathrm{SIN}(\beta/4)),$$

$$\epsilon=\mathrm{ARCSIN}(d/D), \text{ and}$$

$$\beta/2=\mathrm{ARCTAN}((D-d)(2*N*T))$$

wherein D is the height of the screen image, d is the height of the projected image, T is the distance between the screen and the mirror assembly, and N is the number of mirrors on the mirror assembly.

11. A method for projecting an image on to a screen, comprising the steps of
  projecting an image downwardly,
  expanding the image horizontally,
  collimating the horizontally expanding image,
  deflecting the collimated image horizontally,
  deflecting the collimated image upwardly,
  deflecting the collimated image toward a screen, wherein deflecting the collimated image toward the screen includes deflecting the collimated image horizontally, and deflecting the collimated image upwardly, and
  expanding the collimated image vertically along the screen, wherein vertically expanding the image includes directing the collimated image to a cylindrical mirror, and wherein the step of deflecting the collimated image off of a cylindrical mirror includes directing the collimated image toward a the plurality of cylindrical mirrors each having a radius R, wherein the mirror radius R and angle of incidence $\epsilon$ relate to one another according to $$R=d/(2*N*\mathrm{SIN}(45-\epsilon/2)/\mathrm{SIN}(\beta/4)),$$

$$\epsilon=\mathrm{ARCSIN}(d/D), \text{ and}$$

$$\beta/2=\mathrm{ARCTAN}((D-d)(2*N*T))$$

where in D is the height of the screen image, d is the height of the projected image, T is the distance between the screen and the mirror assembly, and N is the number of mirrors.

12. The method of claim 11 wherein the step of horizontally expanding the image includes directing the image through a cylindrical lens.

13. The method of claim 11 wherein the step of collimating the horizontally expanding image includes directing the image through a Fresnel lens.

* * * * *